R. R. BARNETT.
EYEGLASS POLISHING DEVICE.
APPLICATION FILED MAY 24, 1916.

1,202,774.

Patented Oct. 31, 1916.

Inventor
Rosa R. Barnett,
By Victor J. Evans
Attorney

Witnesses
Hugh H. Ott
J. King

THE NORRIS PETERS CO., PHOTO-LITHO., WASHINGTON, D. C.

UNITED STATES PATENT OFFICE.

ROSA REBECCA BARNETT, OF LIMA, OHIO.

EYEGLASS-POLISHING DEVICE.

1,202,774.

Specification of Letters Patent. Patented Oct. 31, 1916.

Application filed May 24, 1916. Serial No. 99,613.

*To all whom it may concern:*

Be it known that I, ROSA REBECCA BARNETT, a citizen of the United States, residing at Lima, in the county of Allen and State of Ohio, have invented new and useful Improvements in Eyeglass-Polishing Devices, of which the following is a specification.

The present invention relates to eye glass polishing devices so designed to permit of the same being easily and readily inserted within a spectacle case when the use of the same is undesired.

Another object of the invention is the provision of a device of the above stated character wherein means are employed for enabling the displacement of the device from the spectacle case.

To this end, use is made of a loop connected between the polishing bodies and when positioned within the spectacle case the polishing bodies are reposed beneath the eye glass lenses with the loop thereof so associated with the nose grip of the glasses as to permit of the latter being removed from the spectacle case in a safe and expeditious manner.

With the above and other objects in view, the invention consists in the novel features, details of construction and combination of parts which will hereinafter be more fully set forth, illustrated in the accompanying drawing and pointed out in the appended claim.

Figure 1:
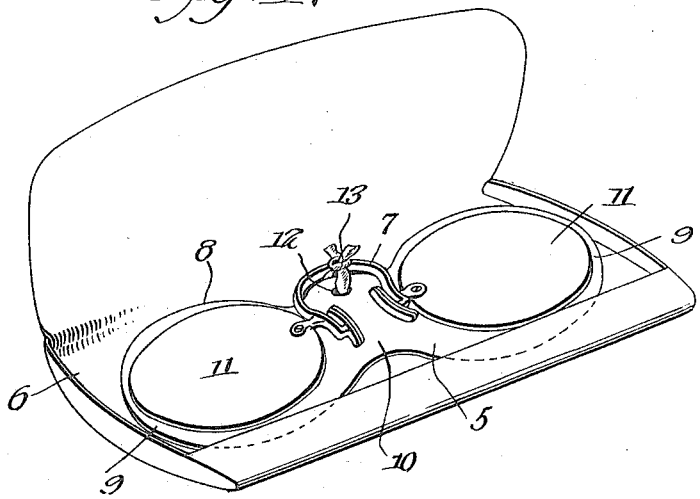
Figure 2:
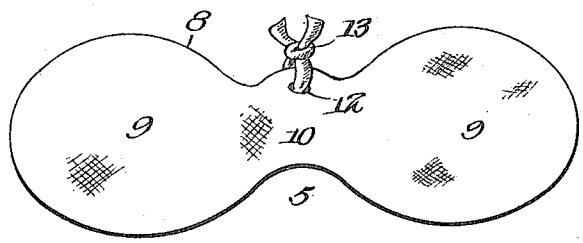
Figure 3:
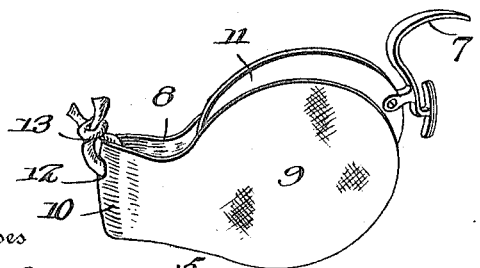

Figure 1 is a perspective view of a spectacle case with a pair of nose glasses mounted therein, clearly illustrating the extracting loop of the eye glass polisher in active position; Fig. 2 is a plan view of the polisher removed from the spectacle case; and Fig. 3 is a perspective view of the same, representing the polisher as it appears when in use in the polishing of one of the lenses of a pair of eye glasses.

Referring more particularly to the accompanying drawing, in which like characters of reference refer to corresponding parts in the several views, 5 denotes my improved eye glass polisher generally, 6 the spectacle case, and 7 a pair of eye glasses disposed therein.

My improved polisher 5 comprises a single piece of cloth 8, preferably excelsior cloth, so cut to provide a pair of oval-shaped polishing bodies 9 connected with one another through the medium of a reduced connecting portion 10. The specific configuration of these polishing bodies enables the same to snugly fit with the opposite surfaces of the eye glass lenses 11, by grasping the eye glasses in one hand and the polisher grasped between the fingers and thumb of the other hand and applied to the lenses, as clearly indicated in Fig. 3 of the drawing. The connecting or uniting portions 10 of the cloth is provided adjacent one edge thereof with a centrally located opening 12 in which is connected an extracting loop 13. This extracting loop is knotted or tied to present the loop with an enlarged portion, whereby the same may be conveniently grasped when it is desired to remove this polisher from the spectacle case. The specific configuration of this polisher further permits of the same being placed in a flat condition within the spectacle case and the polishing bodies 9 thereof are positioned below the eye glass lenses 11 with the extracting loop 13 so disposed with respect to the nose grip of the glasses, whereby the removal of the polisher from the spectacle case will further serve to lift the glasses from the case to a sufficient distance allowing of the user to conveniently and readily grasp the same.

From the foregoing description, taken in connection with the accompanying drawing, the advantages of construction and of the method of operation will be readily apparent to those skilled in the art to which the invention relates, and while I have described the principles of operation of the invention, together with the device which I now consider to be the best embodiment thereof, I desire to have it understood that the device shown is merely illustrative, and that such changes may be made when desired as are within the scope of the claim appended thereto.

I claim:

A polisher of the class set forth comprising a single piece of cloth cut to provide the same with a pair of oval-shaped polishing bodies connected with one another by means of a reduced portion, and an extracting loop loosely connected in an opening formed in such connecting portion.

In testimony whereof I affix my signature.

MRS. ROSA REBECCA BARNETT.

Copies of this patent may be obtained for five cents each, by addressing the "Commissioner of Patents. Washington, D. C."